Figure 1:
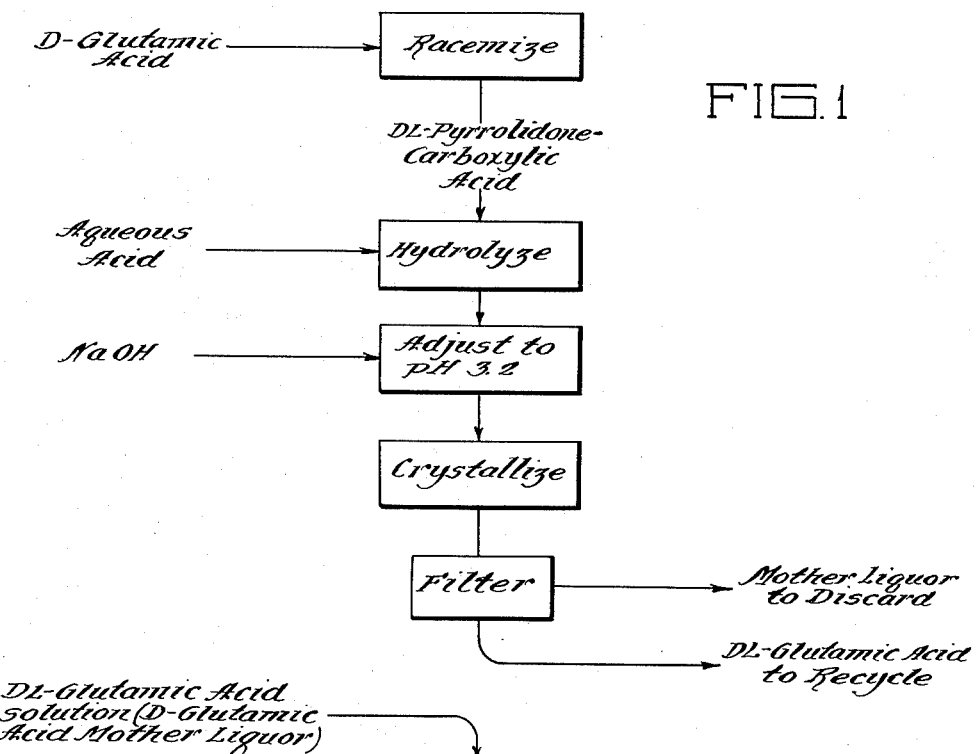

May 16, 1961     H. L. FIKE     2,984,684
RESOLUTION OF DL-GLUTAMIC ACID
Filed June 12, 1958     2 Sheets-Sheet 1

Inventor:
Harold L. Fike
By: Everet F. Smith
Attorney

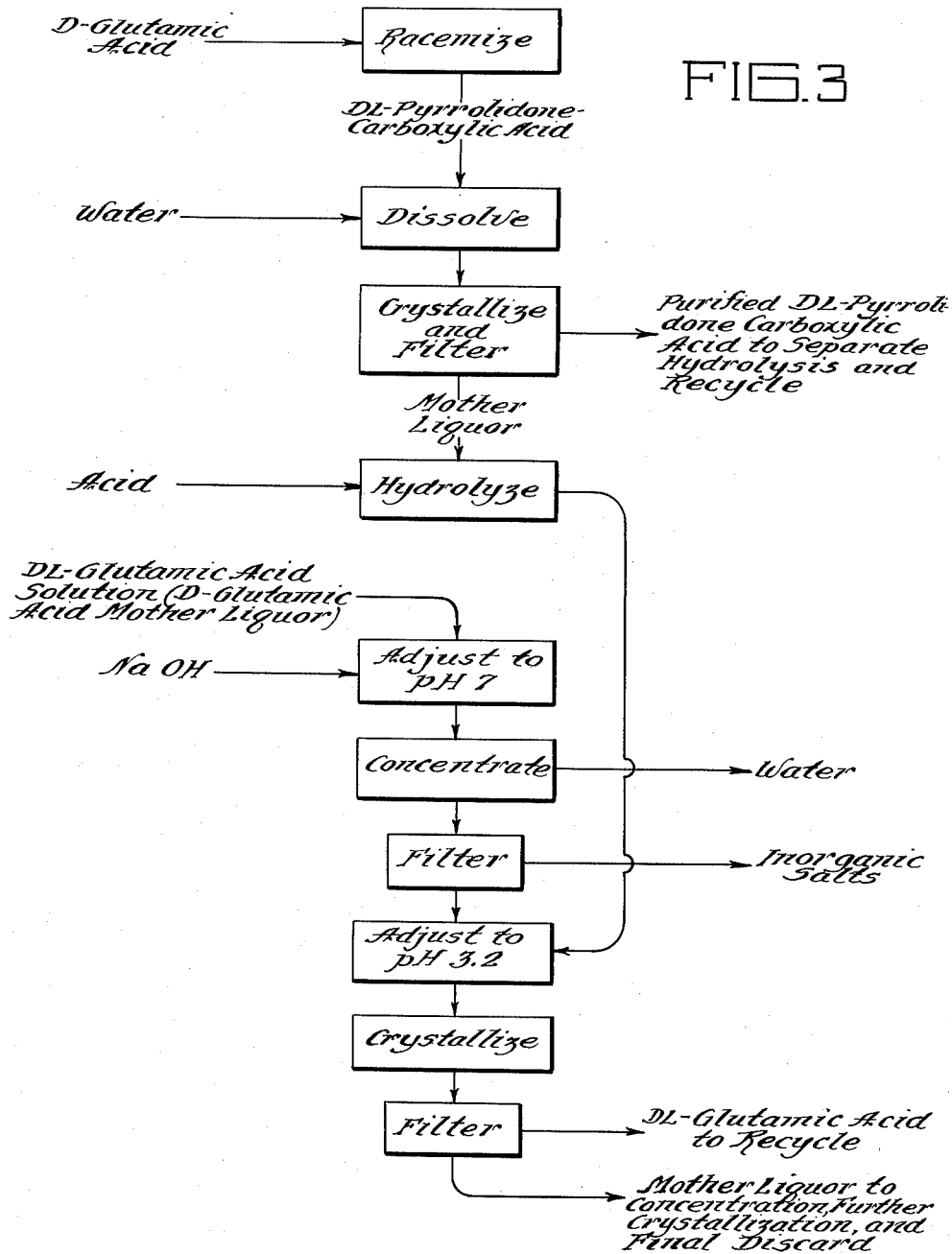

United States Patent Office 2,984,684
Patented May 16, 1961

2,984,684

RESOLUTION OF DL-GLUTAMIC ACID

Harold L. Fike, Chicago, Ill., assignor to International Minerals & Chemical Corporation, a corporation of New York Filed June 12, 1958, Ser. No. 741,498

11 Claims. (Cl. 260—534)

This invention relates to the resolution of DL-glutamic acid. More particularly, it relates to an improvement in the resolution of DL-glutamic acid by selective seeding with crystals of glutamic acid in one of its optically active forms.

An effective method for the resolution of racemic mixtures of glutamic acid is described and claimed in application Serial No. 599,358, filed July 23, 1956, by Joseph L. Purvis, now abandoned in favor of application Serial No. 738,161, filed May 27, 1958, as a continuation-in-part thereof, in which a supersaturated aqueous solution of DL-glutamic acid is seeded with crystals of substantially pure L-glutamic acid or D-glutamic acid to initiate selective crystallization of the seeded enantiomorph, and the crystallization is terminated at or before the period of maximum resolution, ordinarily within a crystallization period of about 10 to about 60 minutes. The seeded enantiomorph is obtained thereby in substantially pure form, without objectionable contamination with the non-seeded enantiomorph.

The selective crystallization of the Purvis process recovers only the portion of the seeded enantiomorph which exists in the supersaturated state in the original solution. After separation of the crystallized solids, the residual solution remains supersaturated in the non-seeded enantiomorph, and additionally contains a considerable quantity of DL-glutamic acid. These materials must be recovered in order for the process to be economically feasible. A suitable recovery process involves crystallizing the non-seeded enantiomorph, with or without seeding, separating the crystals, then concentrating the residual solution and crystallizing the DL-glutamic acid therefrom. The non-seeded enantiomorph is racemized by techniques well known in the art to produce DL-glutamic acid, and all of the DL-glutamic acid is recycled for further resolution.

The recovery, racemization, and recycle of the non-seeded enantiomorph, and the recovery and recycle of the recycled DL-glutamic acid involve certain problems, as will appear more fully hereinafter, which problems are minimized or avoided in the present invention.

An object of the present invention is to resolve DL-glutamic acid in a more convenient and economical manner.

Another object is to improve the overall recovery of glutamic acid values in the resolution of DL-glutamic acid.

Another object is to improve the selective-seeding process for resolving DL-glutamic acid.

Other objects of the invention will be apparent from the present description and claims.

Figure 2:
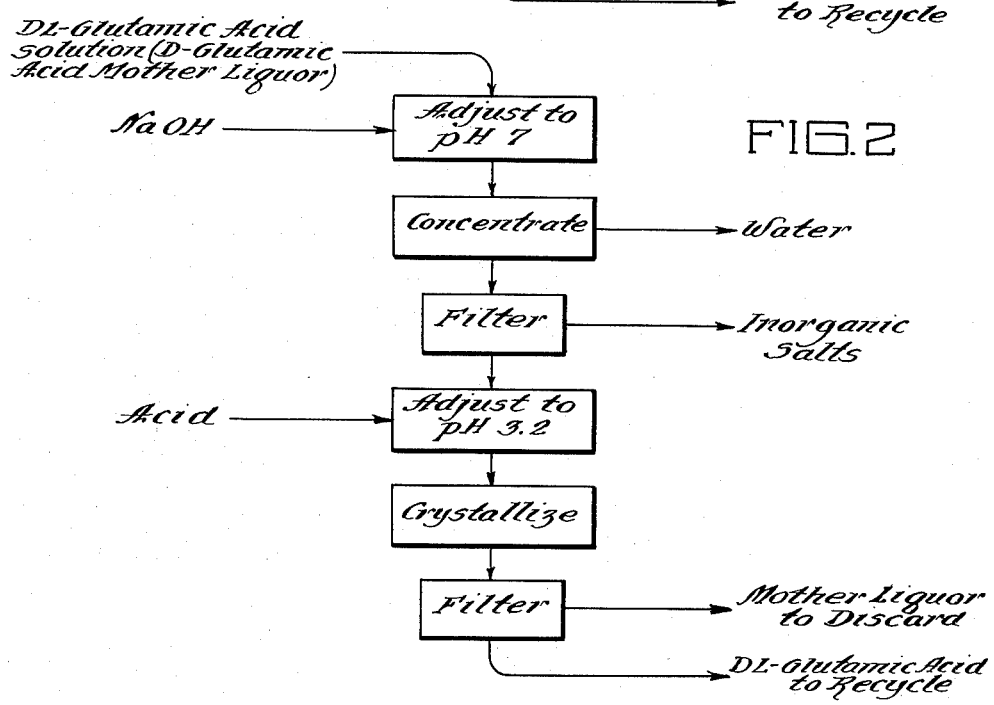

In describing the present invention, it will be necessary to outline in some detail the techniques employed in the prior art for the recovery of glutamic acid values remaining in the solution resulting from the selective-seeding technique of Purvis for resolving DL-glutamic acid, referred to above. For convenience, the process will be described with respect to the selective seeding of a supersaturated DL-glutamic acid solution with L-glutamic acid crystals, whereby a residual solution is obtained which is saturated with DL-glutamic acid and which contains D-glutamic acid in a supersaturated condition. This solution, if allowed to stand at ordinary temperatures with gentle agitation, will spontaneously deposit D-glutamic acid crystals within a short while, ordinarily within about 1 to 2 hours. The crystallization can be accelerated by seeding with a small proportion (about 5% by weight or more) of D-glutamic acid crystals, based on the total weight of glutamic acid contained therein. The crystallization is preferably allowed to continue until the D-glutamic acid supersaturation has been exhausted, and the D-glutamic acid crystals are then filtered off. The D-glutamic acid crystals and the mother liquor, comprising largely DL-glutamic acid, are separately processed as illustrated in Figures 1 and 2 of the attached drawing, which illustrate the prior art.

In the prior-art process, the D-glutamic acid crystals (Figure 1) are racemized by heating for about 24 hours at around 180° C., whereby they are converted to the extent of about 95% into DL-pyrrolidonecarboxylic acid. The racemate is dissolved in aqueous acid, suitably concentrated (37%) hydrochloric acid or other strong mineral acid in aqueous solution, and is hydrolyzed by heating the solution at about 80 to about 120° C. for about 1 to about 6 hours. The conditions required for racemization and hydrolysis are well known in the art. The hydrolyzate is adjusted to about pH 3.2 by adding sodium hydroxide or other alkali in aqueous solution, and is allowed to stand with gentle agitation to permit DL-glutamic acid to crystallize therefrom. Ordinary or somewhat reduced temperatures are best for this purpose, and the crystallization reaches substantial completion in around 24 hours. The crystals are filtered off, washed with water if desired, and recycled for further resolution. The mother liquor may be concentrated to permit one or more additional crops of DL-glutamic acid to be crystallized therefrom. The mother liquor ultimately obtained contains a small proportion of DL-glutamic acid, but is so heavily contaminated with organic materials that recovery thereof is not feasible, and the liquor is therefore discarded.

The D-glutamic acid mother liquor (Figure 2) obtained in the prior-art resolution process and comprising largely DL-glutamic acid is adjusted to around pH 5–7 by adding sodium hydroxide or other alkali, preferably in concentrated aqueous solution, and is then concentrated to around 75 to 85% solids, in which range the solution deposits sodium chloride, sodium sulfate, and/or other inorganic salts depending largely upon the identity of the acids and bases theretofore employed for pH adjustment. The salts are separated by filtration, centrifugation, or the like, and are discarded. The liquor may be further concentrated and desalted if desired. The desalted liquor is further acidified with hydrochloric acid, sulfuric acid, or other suitable acid to around pH 3.2, and the DL-glutamic acid is crystallized therefrom in the same manner as described in connection with Figure 1. The DL-glutamic acid crystals are separated from the resulting slurry and are recycled to further resolution, optionally after being washed. The mother liquor may be further concentrated and desalted at pH 5–7, then acidified to pH 3.2 to produce another crop of DL-glutamic acid crystals if desired. Ultimately, however, the mother liquor must be discarded owing to its relatively high content of inorganic salts, even though it retains a substantial proportion of DL-glutamic acid.

Thus, in the prior-art method for processing the recovered D-glutamic acid, the recovery of the glutamic acid values therefrom is ultimately limited by the presence of organic impurities in the racemized material;

while in the recovery of the glutamic acid values from the D-glutamic acid mother liquor, the recovery is ultimately limited by the presence of inorganic impurities in the process stream.

In accordance with the present invention, illustrated in Figure 3, the D-glutamic acid is racemized, then hydrolyzed with acid, and the resulting acid hydrolyzate is used directly to acidify the desalted D-glutamic acid mother liquor to pH 3.2. This technique avoids separate recovery of DL-glutamic acid from the D-glutamic acid and from the D-glutamic acid mother liquor; it greatly reduces the reagent costs for acid and alkali in the process; and it permits both the organic and the inorganic impurities to be carried out of the system in a single waste liquor, which is for this reason considerably smaller in volume than the two waste liquors involved in the prior-art process. Finally, any glutamic acid values that did not become racemized in the racemization process are recovered, and are not lost in the waste liquor from the D-glutamic acid process stream.

As illustrated in Figure 3, D-glutamic acid crystals recovered from the prior-art resolution process are racemized to DL-pyrrolidonecarboxylic acid under the conditions set forth above. The racemate is dissolve in hot water, then cooled to permit a purified DL-pyrrolidonecarboxylic acid fraction to crystallize. This material is filtered off; and since it is substantially pure, it is conveniently subjected to separate hydrolysis and recycle. The mother liquor can be concentrated and cooled to remove a second or third crop of DL-pyrrolidonecarboxylic acid if desired; however, the presence of organic impurities in the liquor limits the extent of the concentration as well as the purity of the recovered crystals. The mother liquor ultimately obtained is subjected to hydrolysis in a conventional manner in the presence of acid to convert the residual DL-pyrrolidonecarboxylic acid into DL-glutamic acid, and the hydrolyzate is used for acidifying another glutamic acid stream as set forth below.

Meanwhile the recovered D-glutamic acid mother liquor from the prior art resolution process is adjusted to pH 5-7 with sodium hydroxide or other alkali, then concentrated to around 75 to 85% solids, at which point a substantial proportion of the inorganic salts therein are deposited. These salts are separated from the liquid phase and are discarded. The desalted liquor is commingled with the acid hydrolyzate referred to above in a proportion suitable to reach a pH of about 3.2. The adjusted liquid phase is stirred and cooled to permit DL-glutamic acid to crystallize therefrom. The DL-glutamic acid crystals are filtered or centrifuged off, then washed and recycled to further resolution. The mother liquor may be concentrated if desired, then cooled, to separate one or more additional crops of DL-glutamic acid crystals. Ultimately the concentration of organic and inorganic impurities render further recovery of glutamic acid values difficult or impossible, and the liquor must be discarded. In all events, however, the total recovery is substantially greater than the recovery possible with the separate processing techniques of the prior art.

The present invention achieves further improvement in the recovery of glutamic acid values in the following way. The racemization of D-glutamic acid involves first a dehydration and cyclization to D-pyrrolidonecarboxylic acid, then racemization of the latter to DL-pyrrolidonecarboxylic acid. (The racemization of L-glutamic acid proceeds analogously.) The racemization step is comparatively slow, and under the required temperature conditions the racemate tends to volatilize and to be lost. As a practical matter, therefore, the racemization can be considered to have reached the optimum level when the conversion to racemate reaches the same level as the percentage recovery of total product (around 96% at 180° C. at the end of 20-24 hours). This will of course leave a small proportion of non-racemized material. The racemate is readily purified by recrystallizing from water. This recovers only the DL-pyrrolidonecarboxylic acid, however, owing to the fact that the D- and L-isomers are far more soluble in water (around five times as great at 30° C.). Thus, the crystallization of pyrrolidonecarboxylic acid values is far from complete from a solution which is not completely racemized. The recovery is greatly improved in accordance with the present invention by subjecting the DL-pyrrolidonecarboxylic acid mother liquor to acid hydrolysis to convert the residual pyrrolidonecarboxylic acid values into glutamic acid, then using the hydrolyzate for co-neutralizing a desalted glutamic acid liquor to around pH 3.2. By proceeding in this way, nearly all of the non-racemized pyrrolidonecarboxylic acid is converted into glutamic acid of corresponding steric configuration and is recovered by crystallization at pH 3.2.

The following specific examples will more clearly illustrate the invention.

*Example 1*

DL-glutamic acid was partially resolved according to the Purvis technique, referred to above, by seeding with L-glutamic acid, allowing to crystallize, and filtering off the crystals. The resulting solution was seeded with D-glutamic acid crystals, and the crystallization of D-glutamic acid was allowed to go to equilibrium. The crystals were filtered off, leaving an aqueous solution comprising largely DL-glutamic acid.

D-glutamic acid (134.3 grams) thus recovered was heated 21 hours at 180° C. to effect racemization thereof. The heated material, weighing 113.1 grams compared with a theoretical expectation of about 117.4 grams, was dissolved in 500 milliliters of water, stirred with 13.4 grams of activated carbon, and filtered. The carbon cake was washed with 100 milliliters of hot water. The filtrate and washings were combined and cooled, and DL-pyrrolidonecarboxylic acid was allowed to crystallize therefrom. The crystals were filtered off. The mother liquor was concentrated and cooled, and a second crop of DL-pyrrolidonecarboxylic acid was crystallized and removed. The total recovery of DL-pyrrolidonecarboxylic acid was 92.1 grams. The final mother liquor (60 grams) was acidified with 24 grams of 37% hydrochloric acid and hydrolyzed by heating 4 hours at 105° C. The hydrolyzate was reserved for use later in the process.

The D-glutamic acid mother liquor (2000 grams) was adjusted to pH 6 with 23 grams of aqueous 50% sodium hydroxide solution, then concentrated to 400 grams. The inorganic salts deposited thereby were filtered off. The filtrate was concentrated, this time to 200 grams, and a second inorganic salt crop was filtered off. The total weight of salts thus removed was 97 grams, dry basis. The resulting filtrate was adjusted to pH 3.2 with 67 grams of acid-hydrolyzed DL-pyrrolidonecarboxylic acid mother liquor, obtained as described above, and crystallization of DL-glutamic acid was allowed to proceed for 24 hours. The resulting slurry was filtered and the crystals were washed with 20 grams of water. The mother liquor was readjusted to pH 6 with 5 grams of sodium hydroxide, concentrated, desalted, acidified, and allowed to crystallize, 17 grams of the hydrolyzed DL-pyrrolidonecarboxylic acid mother liquor being required for the acidification. A total of 61.8 grams of DL-glutamic acid was recovered, and the final mother liquor (end liquor) contained only 4.0 grams of glutamic acid values.

*Example 2*

Monosodium DL-glutamate dihydrate (55.6 grams, equivalent to 40 grams of DL-glutamic acid) was dissolved in a sufficient quantity of water to make a solution weighing 700 grams. The solution was adjusted to pH 3.2 with 22 grams of 37% hydrochloric acid, then seeded with 2 grams of L-glutamic acid crystals and stirred gently at room temperature. After 15 minutes, the L-glutamic acid crystals thus produced (7.3 grams) were filtered off and withdrawn for production of monosodium L-glutamate.

The filtrate was allowed to stand at room temperature for about 24 hours, during which time D-glutamic acid spontaneously crystallized. The D-glutamic acid (7.3 grams) was filtered off and heated at 180° C. for 20 hours to effect racemization and conversion thereof into DL-pyrrolidonecarboxylic acid. The racemate was commingled with 10 grams of water and 5 grams of 37% hydrochloric acid, then refluxed for 3 hours to hydrolyze the DL-pyrrolidonecarboxylic acid to DL-glutamic acid. A hydrolyzate weighing 22 grams was obtained.

The D-glutamic acid mother liquor (700 grams, comprising largely DL-glutamic acid) was divided into two portions. One portion, weighing 510 grams, was recycled to the beginning of the process for further resolution by selective seeding, suitably after fortification with additional DL-glutamic acid. The remaining portion (190 grams) was adjusted to pH 6 with 4 grams of aqueous 50% sodium hydroxide solution, concentrated to cause sodium chloride to crystallize therefrom, and filtered hot. The sodium chloride was discarded. The desalted liquor (22 grams) was commingled with the hydrolyzate of DL-pyrrolidonecarboxylic acid obtained as described above to pH 3.2, and DL-glutamic acid was allowed to crystallize therefrom over a period of 16 hours. The slurry was filtered, and 13.8 grams of DL-glutamic acid were recovered. This material was recycled to the beginning of the process for further resolution by selective seeding. The end liquor (30 grams) contained 0.8 gram of DL-glutamic acid, together with all of the impurities present in both the desalted liquor and the hydrolyzate. This material was discarded.

While the invention has been illustrated by reference to certain specific features and embodiments thereof, it is to be understood that such matters are illustrative only, and not by way of limitation. For instance, the invention is equally applicable in conjunction with a resolution process wherein D-glutamic acid is first recovered from DL-glutamic acid solution by selective seeding and crystallization, and L-glutamic acid is subsequently recovered therefrom, racemized, hydrolyzed, and used for final acidification (to pH 3.2) of desalted L-glutamic acid mother liquor containing largely DL-glutamic acid. The invention is further useful in conjunction with parallel processes for resolving DL-glutamic acid hydrochloride or DL-glutamic acid hydrobromide by the Purvis technique, employing selective seeding with crystals of an optically active form of the dissolve compound. The invention is further useful in conjunction with the resolution of ammonium DL-glutamate by selective seeding with crystals of ammonium D- or L-glutamate, in which case the residual ammonium compounds must ultimately be converted into glutamic acid or glutamic acid hydrochloride or hydrobromide for processing as described herein. The invention is useful broadly in conjunction with processes for resolving DL-glutamic acid compounds wherein the resolution leaves a mixture of glutamic acid compounds that is unbalanced with respect to the D- and L-isomer content, so long as the said compounds are convertible into free glutamic acid or into glutamic acid hydrochloride or hydrobromide. It will thus be apparent that numerous modifications and equivalents of the invention will readily occur to those skilled in the art.

The following claims particularly point out and distinctly claim the subject matter of the invention.

I claim:

1. In a method for resolving a DL-glutamic acid compound selected from the group consisting of DL-glutamic acid, DL-glutamic acid hydrochloride, DL-glutamic acid hydrobromide, and monoammonium DL-glutamate, which method comprises separating a portion of one enantiomorph, A, therefrom, leaving an unbalanced mixture of the enantiomorphs containing an excess of the other enantiomorph, B, crystallizing and separating the excess of said other enantiomorph, B, from a solution of said unbalanced mixture, leaving a mother liquor comprising the DL-glutamic acid compound, racemizing and converting said enantiomorth B to DL-pyrrolidonecarboxylic acid, hydrolyzing DL-pyrrolidonecarboxylic acid values obtained thereby to DL-glutamic acid, recovering DL-glutamic acid from the hydrolyzate, and recycling the DL-glutamic acid to further resolution, desalting said mother liquor comprising the DL-glutamic acid compound, acidifying the desalted mother liquor to around pH 3.2, crystallizing DL-glutamic acid therefrom, and recycling the DL-glutamic acid to further resolution, the improvement which comprises effecting said hydrolysis of DL-pyrrolidonecarboxylic acid values under acid conditions, and employing the resulting hydrolyzate for acidification of the desalted mother liquor to around pH 3.2.

2. In a method for resolving DL-glutamic acid compounds, which method comprises seeding a supersaturated solution of a racemic glutamic acid compound selected from the group consisting of glutamic acid, glutamic acid hydrochloride, glutamic acid hydrobromide, and monoammonium glutamate with crystals of one of its enantiomorphs, A, selectively crystallizing and separating said enantiomorph A therefrom, crystallizing and separating the other enantiomorph, B, from the remaining solution, leaving a mother liquor comprising the racemic glutamic acid compound, racemizing and converting said enantiomorph B to DL-pyrrolidonecarboxylic acid, hydrolyzing DL-pyrrolidonecarboxylic acid values obtained thereby to DL-glutamic acid, recovering DL-glutamic acid from the hydrolyzate, and recycling the DL-glutamic acid to further resolution, desalting said mother liquor comprising the racemic acid compound, acidifying the desalted mother liquor to around pH 3.2, crystallizing DL-glutamic acid therefrom, and recycling the DL-glutamic acid to further resolution, the improvement which comprises effecting said hydrolysis of DL-pyrrolidonecarboxylic acid values by heating with a strong mineral acid, and employing the resulting hydrolyzate for acidification of the desalted mother liquor to around pH 3.2.

3. A method as in claim 2 wherein said racemic glutamic acid compound is free DL-glutamic acid.

4. A method as in claim 2 wherein said racemic glutamic acid compound is DL-glutamic acid hydrochloride.

5. A method as in claim 2 wherein said racemic glutamic acid compound is DL-glutamic acid hydrobromide.

6. A method for resolving DL-glutamic acid, which method comprises seeding a supersaturated solution thereof with crystals of L-glutamic acid, selectively crystallizing and separating L-glutamic acid therefrom, selectively crystallizing and separating D-glutamic acid from the remaining solution, leaving a D-glutamic acid mother liquor comprising DL-glutamic acid, racemizing and converting the recovered D-glutamic acid to DL-pyrrolidonecarboxylic acid, recovering DL-pyrrolidonecarboxylic acid from an aqueous solution thereof, hydrolyzing the DL-pyrrolidonecarboxylic acid mother liquor by heating in an aqueous medium in the presence of a strong mineral acid, desalting said D-glutamic acid mother liquor comprising DL-glutamic acid at a pH around 5 to 7, acidifying the desalted liquor to around pH 3.2 with the hydrolyzed DL-pyrrolidonecarboxylic acid mother liquor, crystallizing DL-glutamic acid therefrom, and recycling the DL-glutamic acid to further resolution.

7. A method for resolving DL-glutamic acid, which method comprises seeding a supersaturated solution thereof with crystals of D-glutamic acid, selectively crystallizing and separating D-glutamic acid therefrom, selectively crystallizing and separating L-glutamic acid from the remaining solution, leaving an L-glutamic acid mother liquor comprising DL-glutamic acid, racemizing and converting the recovered D-glutamic acid to DL-pyrrolidonecarboxylic acid, recovering DL-pyrrolidonecarboxylic acid from an aqueous solution thereof, hydrolyzing the DL-pyrrolidonecarboxylic acid mother liquor by heating in an aqueous medium in the presence of a strong mineral acid, desalting said L-glutamic acid mother liquor comprising DL-glutamic acid at a pH around 5 to 7, acidifying the desalted liquor to around pH 3.2 with the hydrolyzed DL-pyrrolidonecarboxylic acid mother liquor, crystallizing DL-glutamic acid therefrom, and recycling the DL-glutamic acid to further resolution.

8. A method for resolving DL-glutamic acid hydrochloride, which method comprises seeding a supersatuated solution thereof with crystals of L-glutamic acid hydrochloride, selectively crystallizing and separating L-glutamic acid hydrochloride therefrom, crystallizing and separating D-glutamic acid hydrochloride from the remaining solution, leaving a D-glutamic acid hydrochloride mother liquor comprising DL-glutamic acid hydrochloride, racemizing and converting the recovered D-glutamic acid hydrochloride to DL-pyrrolidonecarboxylic acid, recovering DL-pyrrolidonecarboxylic acid from an aqueous solution thereof, hydrolyzing the DL-pyrrolidonecarboxylic acid mother liquor by heating with aqueous hydrochloric acid, desalting said D-glutamic acid hydrochloride mother liquor comprising DL-glutamic acid hydrochloride at a pH around 5 to 7, acidifying the desalted liquor to around pH 3.2 with the hydrolyzed DL-pyrrolidonecarboxylic acid mother liquor, crystallizing DL-glutamic acid therefrom, and recycling the DL-glutamic acid to further resolution.

9. A method for resolving DL-glutamic acid hydrochloride, which method comprises seeding a supersaturated solution thereof with crystals of D-glutamic acid hydrochloride, selectively crystallizing and separating D-glutamic acid hydrochloride therefrom, crystallizing and separating L-glutamic acid hydrochloride from the remaining solution, leaving an L-glutamic acid hydrochloride mother liquor comprising DL-glutamic acid hydrochloride, racemizing and converting the recovered D-glutamic acid hydrochloride to DL-pyrrolidonecarboxylic acid, recovering DL-pyrrolidonecarboxylic acid from an aqueous solution thereof, hydrolyzing the DL-pyrrolidonecarboxylic acid mother liquor by heating with aqueous hydrochloric acid, desalting said L-glutamic acid hydrochloride mother liquor comprising DL-glutamic acid hydrochloride at a pH around 5 to 7, acidifying the desalted liquor to around pH 3.2 with the hydrolyzed DL-pyrrolidonecarboxylic acid mother liquor, crystallizing DL-glutamic acid therefrom, and recycling the DL-glutamic acid to further resolution.

10. A method for resolving monoammonium DL-glutamate, which method comprises seeding a supersaturated solution thereof with crystals of monoammonium L-glutamate, selectively crystallizing and separating monoammonium L-glutamate therefrom, crystallizing and separating monoammonium D-glutamate from the remaining solution, leaving a monoammonium D-glutamate mother liquor comprising monoammonium DL-glutamate, racemizing and converting the recovered monoammonium D-glutamate to DL-pyrrolidonecarboxylic acid, recovering DL-pyrrolidonecarboxylic acid from an aqueous solution thereof, hydrolyzing the DL-pyrrolidonecarboxylic acid mother liquor by heating in an aqueous medium in the presence of a strong mineral acid, desalting said monoammonium D-glutamate mother liquor containing monoammonium DL-glutamate at a pH around 5 to 7, acidifying the desalted liquor to around pH 3.2 with the hydrolyzed DL-pyrrolidonecarboxylic acid mother liquor, crystallizing DL-glutamic acid therefrom, and recycling the DL-glutamic acid to further resolution.

11. A method for resolving monoammonium DL-glutamate, which method comprises seeding a supersaturated solution thereof with crystals of monoammonium D-glutamate, selectively crystallizing and separating monoammonium D-glutamate therefrom, crystallizing and separating monoammonium L-glutamate from the remaining solution, leaving a monoammonium L-glutamate mother liquor comprising monoammonium DL-glutamate, racemizing and converting the recovered monoammonium D-glutamate to DL-pyrrolidonecarboxylic acid, recovering DL-pyrrolidonecarboxylic acid from an aqueous solution thereof, hydrolyzing the DL-pyrrolidonecarboxylic acid mother liquor by heating in an aqueous medium in the presence of a strong mineral acid, desalting said monoammonium L-glutamate mother liquor containing monoammonium DL-glutamate at a pH around 5 to 7, acidifying the desalted liquor to around pH 3.2 with the hydrolyzed DL-pyrrolidonecarboxylic acid mother liquor, crystallizing DL-glutamic acid therefrom, and recycling the DL-glutamic acid to further resolution.

References Cited in the file of this patent

UNITED STATES PATENTS

| 2,734,919 | Amiard et al. | Feb. 14, 1956 |
| 2,806,855 | Hoglan | Sept. 17, 1957 |

OTHER REFERENCES

Foreman: Chemical Ab., vol. 8 (1915), page 632.

Wilson et al.: Journal Biol. Chem., vol. 119, page 313 (1937).

Howben: Die Methoden der Org. Chem., vol. 2 (1943), page 1065.